A. D. Crane
Spoke Lathe.
Nº 11,518. Patented Aug. 15, 1854.
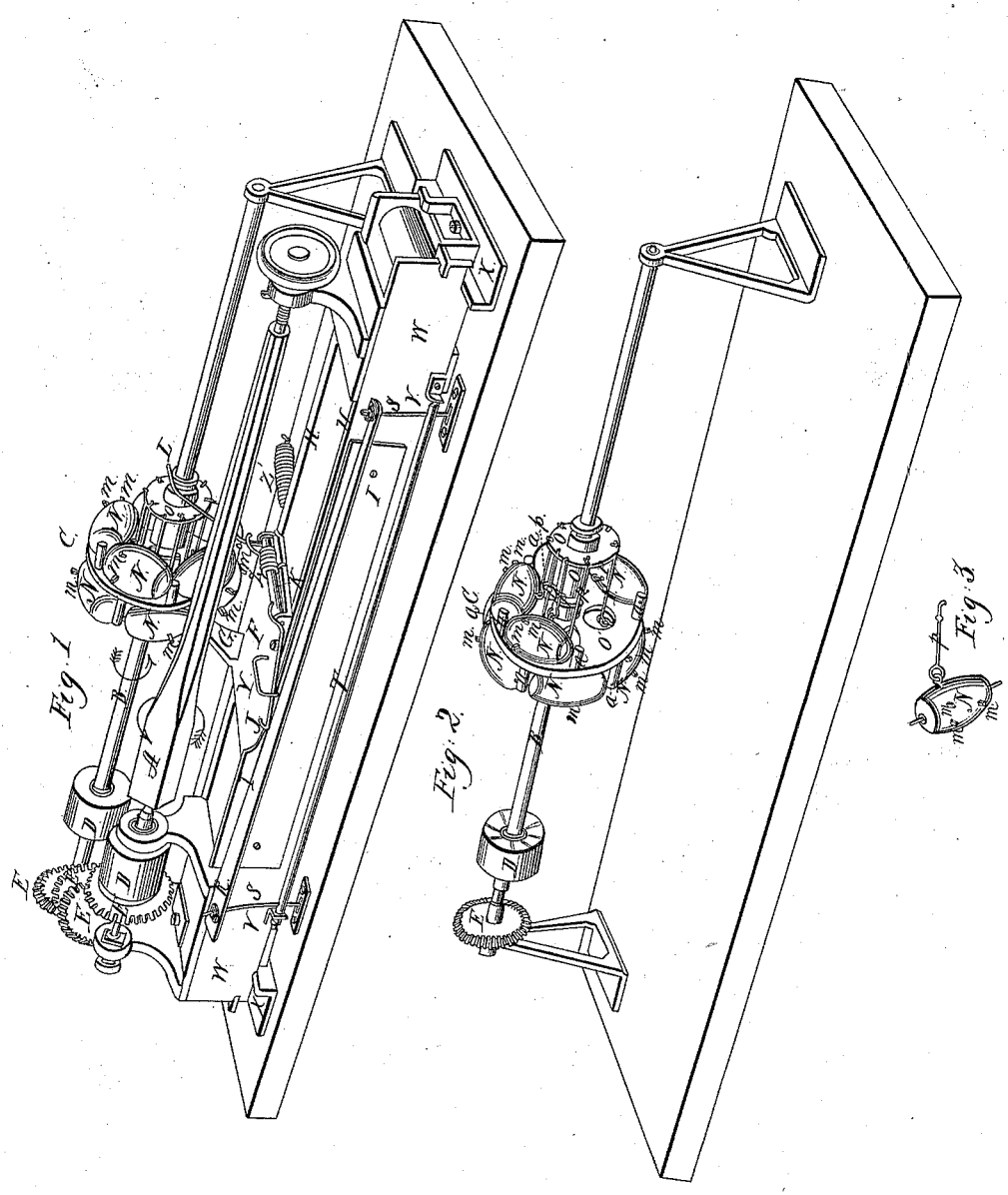

UNITED STATES PATENT OFFICE.

AARON D. CRANE, OF NEWARK, NEW JERSEY.

MACHINE FOR TURNING IRREGULAR FORMS.

Specification of Letters Patent No. 11,518, dated August 15, 1854.

*To all whom it may concern:*

Be it known that I, AARON D. CRANE, of the city of Newark, in the county of Essex and State of New Jersey, have invented a new and useful Machine for Turning Wood and Metal; and I do hereby declare that the following is a full and exact description thereof, reference being had to the accompanying drawings, making a part of this specification, in which—

Figure 1 is a perspective view thereof, Fig. 2 a perspective view of the cutting wheel of the same and Fig. 3 a perspective view of one of the cutting shafts or rollers of said cutting wheel detached therefrom.

The nature of my invention consists in cutting or turning wood or metal with regular or irregular curved plain or spiral surfaces, by means of a series of cutters or knives (combined together guided and controlled as hereinafter described) so adjusted on a shaft as to travel in a longitudinal direction the length of the materials to be cut. Said shaft being adjusted in a line parallel with the axis of motion of the said materials and said cutters and materials both revolving at a high rate of speed in the same direction.

In Fig. 1, A, represents the materials to be cut (which in this case is a baluster). B, represents the shaft upon which travels the cutting wheel C. D, D, are the driving pulleys respectively of the cutting shaft, and of the materials to be cut, the same belt passing under and driving both pulleys. E, E, E, E, are cog wheels geared together in such a manner as that the number of the revolutions of the shaft B, and of the materials to be cut, may be made precisely the same or so adjusted as that (for purposes hereinafter described). Either the cutting shaft or the materials to be cut may gain or lose one revolution in any given number of revolutions. F, is a carriage attached by means of the arm G, to the cutting wheel C, and moving upon the guides H, H, in company with C. I, is a skein or guide along the edge of which the governing rod J, passes. J, is attached to the small shaft K; K, is attached to the carriage F. The rod L, is also attached to K, and is controlled in its movements, which are lateral by the motion of J, as it passes along the skein or guide I. N, N, N, N, are shafts or rollers of wood or metal so adjusted as partially to revolve on their axis, and are controlled by the lateral movements of the rod L, by means of the disk and tube O, which slides in company with the cutting wheel C, upon the shaft B. The disk and tube O, are only connected with the cutting wheel C, by the rods seen at p, p, p, p, p, (Fig. 2) said rods being attached, respectively to the disk O, and to the cutting shafts N, N, N, N. R, is a skein or guide supported by the levers S, S, attached to the shaft T, which in its turn is attached or pivoted to the body of the lathe at V, V. W, W, is that part of the lathe in which the materials A, is placed and is so adjusted as to slide upon the guides H, H. The motion of W, W, is controlled and regulated by means of the rods Y, attached to the carriage F, and acting upon the skein or guide R, against the edge of which, as the carriage is moving along, it is pressed thus throwing the materials to be cut toward or from the cutting wheel C, as may be required. The requisite motion is imparted to the carriage F, and the cutting wheel C, either toward the right or left by means of a feeding screw or other equivalent adjustment. The spring seen at Z, is for the purpose of pressing the rod J, firmly against the edge of the guide I, and the spring Z′ serves to keep the part of the lathe W, W, in proper position by pressing the skein or guide R, firmly against the rod Y.

In Fig. 2 the cutting wheel C, and shaft B, are represented separate and apart from the rest of the lathe. One of the cutting shafts or rollers N, is detached from the cutting wheel C, and is represented separately by Fig. 3. The cutting shafts N, N, N, N, (Fig. 2) are adjusted in a position at right angles to the shaft, B, and are supported each upon its axis by the projections a, a, a, a, these projections proceed from the disk O′, which disk is the body of the cutting wheel C, and is adjusted so as to slide freely upon the shaft B. The rods p, p, p, p, p, serve to connect the shafts N, N, N, N, with the disk and tube O, O, O, O, are so adjusted as to be free to move a limited distance upon the shaft B, toward or from C. Where the disk and tube O, O, are moved from C, the shafts N, N, N, N, revolve partially in the opposite direction, thus throwing the knives m, m, m, m, m, to the left and more or less away from the materials to be cut.

The operation of my machine is as follows—the materials A, and the shaft B, (Fig. 1) being made to revolve rapidly in the direction indicated by the arrows the knives m, m, m, m, m, are brought successively in contact with A, in such manner as that each knife will cut a separate and independent side of A,—as is represented in Fig. 1,—at the same time the cutting wheel C, in connection with the carriage F, is slowly moving either to the right or left, thus carrying the rod J, along the edge of the skein or guide I, in such manner as that the rod L, is made by means of the disk and tube O, O, and the connecting rods p, p, p, p, p, (Fig. 2) to partially revolve the shaft N, N, N, N, and thus to bring the knives m, m, m, m, m, successively in position appropriate for the cutting of A, into the required or designed forms. The rod Y, is also moving along the guide R, and operating to throw the materials A, toward or from the cutting wheel C, as may be required. Thus the form of the materials when cut (the adjustment of the knives being the same) will be wholly dependent upon the form of the guides I, and R. These guides may be changed or modified at pleasure. The construction of the cutting wheel C, may be also changed, as for example, the shafts N, N, N, N, may be so adjusted as to radiate from the center of the disk O', and the cutting knives m, m, m, m, m, may be adjusted at the ends of the said shafts and operated substantially in the manner above set forth. Instead of the shafts N, N, N, N, being all controlled by the form of the same guide or skein I, the machine may be so constructed and adjusted as that the said shafts may be each or any number of them controlled by separate skeins or guides so that the separate knives of each shaft may be made to cut independently to their separate guides. By adjusting the gearing wheels E, E, E, E, in such manner as that the cutting wheel C, is made to revolve a given number of times faster than the revolutions of the materials A, one shaft or knife may be made to cut alone any required number of sides—as for example one cutting knife revolving three times faster than the materials to be cut would meet the materials three times in each of its (the materials) revolutions and would form it into a longitudinal triangular shape hewing concave sides. By reversing this order of motion and making the materials to revolve three times faster than the cutting knife or knives the separate surfaces of the materials would be more or less convexed according to the number of knives used and the manner in which they are controlled by the skeins or guides employed. By adjusting the gearing wheels E, E, E, E, in such a manner as that the cutting wheel C, will gain or lose in its revolutions fractionally either more or less than the materials to be cut (the machine in other respects remaining the same) the materials, instead of being cut longitudinally as represented in Fig. 1 would assume a spiral or twisted form either toward the left or right, as the cutting wheel either gains or loses, relatively in its motion.

In addition to the shafts N, N, N, N, in the cutting wheels C, other shafts or knives may also be introduced therein, adjusted in such a manner as to revolve at right angles or different angles to the motions of N, N, N, N, meeting and cutting the respective sides of the materials A, and leaving at intervals knobs or projections thereon. I have thus pointed out the principles of my invention the mode of constructing and using the same, and the manner in which I have contemplated its application.

I do not claim as my invention the principle of cutting irregular surfaces by means of a cutter or a series of cutters revolving in contact with the materials to be cut—said materials also revolving in the same direction with the said cutter or cutters—but What I do claim as my invention and desire to secure by Letters Patent is—

The cutting wheel C, combined together, guided and controlled substantially in the manner and for the purposes herein set forth.

AARON D. CRANE.

Witnesses:
MOSES G. CRANE,
JOHN F. CHASE.